United States Patent
Arai et al.

(10) Patent No.: US 7,955,703 B2
(45) Date of Patent: Jun. 7, 2011

(54) SILICONE RUBBER BASED PRESSURE SENSITIVE ADHESIVE SHEET

(75) Inventors: Takayuki Arai, Tokyo (JP); Kazuhiro Kon, Saitama (JP)

(73) Assignee: Lintec Corporation, Tokyo (JP)

( * ) Notice: Subject to any disclaimer, the term of this patent is extended or adjusted under 35 U.S.C. 154(b) by 105 days.

(21) Appl. No.: 11/155,622

(22) Filed: Jun. 20, 2005

(65) Prior Publication Data
US 2006/0008662 A1 Jan. 12, 2006

(30) Foreign Application Priority Data
Jul. 12, 2004 (JP) ................................ 2004-204776

(51) Int. Cl.
*B32B 9/04* (2006.01)
*C08F 283/12* (2006.01)

(52) U.S. Cl. ........................................ 428/447; 525/447

(58) Field of Classification Search .................... 428/447
See application file for complete search history.

(56) References Cited

U.S. PATENT DOCUMENTS

| | | | | |
|---|---|---|---|---|
| 3,527,655 A * | 9/1970 | Ballard | ........................ | 427/133 |
| 3,983,298 A * | 9/1976 | Hahn et al. | ............ | 428/355 RA |
| 4,339,485 A * | 7/1982 | Shibano et al. | ............. | 428/41.3 |
| 4,529,645 A * | 7/1985 | Berg et al. | .................. | 428/298.7 |
| 4,707,503 A * | 11/1987 | Itoh et al. | ......................... | 522/99 |
| 4,774,297 A * | 9/1988 | Murakami et al. | ............ | 525/478 |
| 4,870,149 A * | 9/1989 | Hara et al. | ....................... | 528/15 |
| 4,895,761 A * | 1/1990 | Kashida et al. | ............... | 428/336 |
| 4,943,620 A * | 7/1990 | Gomyo et al. | ................ | 525/474 |
| 5,064,891 A * | 11/1991 | Fujiki et al. | .................... | 524/264 |
| 5,073,422 A * | 12/1991 | Konno et al. | ................. | 428/40.7 |
| 5,082,706 A * | 1/1992 | Tangney | ........................ | 428/40.7 |
| 5,100,976 A * | 3/1992 | Hamada et al. | ............... | 525/477 |
| 5,110,882 A * | 5/1992 | Hamada et al. | ............... | 525/478 |
| 5,248,739 A * | 9/1993 | Schmidt et al. | ................ | 525/477 |
| 5,466,532 A * | 11/1995 | Wengrovius et al. | ......... | 428/447 |
| 5,576,110 A * | 11/1996 | Lin et al. | ........................ | 428/447 |
| 5,696,209 A * | 12/1997 | King et al. | ..................... | 525/478 |
| 5,863,625 A * | 1/1999 | Chiou | .......................... | 428/36.1 |
| 6,040,026 A * | 3/2000 | Iwabuchi et al. | ............. | 428/40.1 |
| 6,127,503 A * | 10/2000 | Fujioka et al. | .................. | 528/15 |
| 6,171,672 B1 * | 1/2001 | Koike et al. | ................... | 428/40.1 |
| 6,387,487 B1 * | 5/2002 | Greenberg et al. | ........ | 428/355 R |
| 6,489,031 B2 * | 12/2002 | Muller et al. | .................. | 428/447 |
| 6,689,442 B2 * | 2/2004 | Nakamura et al. | ............ | 428/41.4 |
| 6,887,932 B2 * | 5/2005 | Azechi | ........................... | 524/492 |
| 6,899,949 B2 * | 5/2005 | Imono et al. | ................... | 428/354 |
| 7,592,070 B2 * | 9/2009 | Takanami et al. | .............. | 428/448 |
| 2007/0059535 A1 * | 3/2007 | Nakamura | ..................... | 428/447 |

FOREIGN PATENT DOCUMENTS

EP 1384765 A1 * 1/2004
WO WO-2004/111151 * 12/2004

* cited by examiner

*Primary Examiner* — Randy Gulakowski
*Assistant Examiner* — Robert Loewe
(74) *Attorney, Agent, or Firm* — Oblon, Spivak, McClelland, Maier & Neustadt, L.L.P.

(57) ABSTRACT

There are disclosed a silicone rubber based pressure sensitive adhesive sheet comprising a transparent substrate film and a silicone rubber layer which is formed by coating the surface of the transparent substrate film with silicone rubber in an amount of 5 to 100 g/m² (after drying) containing addition type organopolysiloxane composed of organopolysiloxane having a siloxane bond as a principal skeleton and bearing an alkenyl group and of organohydrogenpolysiloxane, the silicone rubber further containing 0.01 to 3.0 parts by mass of a platinum catalyst based on 100 parts by mass of the addition type organopolysiloxane, and then by curing the resultant coating, and which has adhesion for float glass in accordance with JIS Z 0237 being in the range of 10 to 1000 mN/25 mm, holding power (load of one kg) of at least 24 hours and a 100% modulus in the range of 0.3 to 1.5 MPa. The resultant silicone rubber based pressure sensitive adhesive sheet is imparted with strong holding power, sufficient adhesiveness to the substrate film and sufficient removability from an adherend enabling repeated sticking even if an additive such as an adhesion improving agent is not blended, and at the same time which makes it possible to use as a releasing film, an inexpensive film not subjected to a releasing treatment.

17 Claims, No Drawings

SILICONE RUBBER BASED PRESSURE SENSITIVE ADHESIVE SHEET

BACKGROUND OF THE INVENTION

1. Field of the Invention

The present invention relates to a silicone rubber based pressure sensitive adhesive sheet which has slight pressure sensitive-adhesiveness, and is excellent in removability and which has high holding power.

2. Description of the Related Arts

Accompanying the development and advancement of information industries and electronic technology in recent years, display units such as CRT displays, liquid crystal displays, plasma displays and the like have come to be widely employed, including not only TV sets and personal computers but also copying machinery, facsimiles, watches/clocks, telephones.

It is a general practice to stick on a display screen in any of these display units, a protective film for the purpose of protecting the surfaces of the screen from breakage and/or scratch on impact; or a functional film for the purpose of imparting such functions as anti-reflection, antistatic property, antifoulancy, antiglare and the like.

There is formed on any of the above-mentioned various films, a pressure sensitive adhesive layer composed of a pressure sensitive adhesive such as an acrylic pressure sensitive adhesive. The pressure sensitive adhesive layer composed of an ordinary used pressure sensitive adhesive involves the problem of difficulty in exhibiting sufficient holding power at the time of repetitive sticking, since upon peeling off, the shape of an adherend remains un-removed on the surface of the pressure sensitive adhesive layer, and thus the surface fails to restore to the original flat state, or considerable period of time is required in restoring to the flat state.

On the contrary, a silicone rubber based pressure sensitive adhesive sheet wherein a silicone rubber layer is formed on the surface of a transparent substrate film is used as a protective sheet alone or in combination with anyone of a variety of functional films, because the silicone rubber layer is imparted with an excellent cushioning property.

The silicone rubber layer of the silicone rubber based pressure sensitive adhesive sheet is composed of silicone rubber which is usually blended with polysiloxane, a catalyst, a cross-linking agent and in addition an additive such as an adhesion improving agent or the like used for the purpose of improving adhesiveness to a substrate film (for instance, refer to Japanese Patent Application Laid-Open No. 56694/2000 (Heisei 12)).

However, since the blending of such an additive increases the adhesiveness of the silicone rubber, it has been necessary from a practical aspect to use a releasing film which is subjected to a releasing treatment with an expensive fluorine base material.

SUMMARY OF THE INVENTION

While the present invention has been made in the light of the above-mentioned prior arts, it is an object of the present invention to provide a silicone rubber based pressure sensitive adhesive sheet which has favorable adhesiveness to a substrate film even if an additive such as an adhesion improving agent is not blended thereto, which has removability, thus enabling repetitively sticking to an adherend such as a display screen, and which makes it possible to use as a releasing film, an film not subjected to a releasing treatment.

Other object of the present invention will become obvious from the text of the specification hereinafter disclosed.

In order to achieve the above-mentioned objects, intensive extensive research and investigation were accumulated by the present inventors. As a result it has been discovered that the objects can be achieved by forming a silicone rubber layer imparted with specific characteristics by coating a substrate film with a prescribed amount of silicone rubber containing addition type organopolysiloxane.

The present invention has been accomplished by the foregoing findings and information.

That is to say, the present invention provides the following.

1. A silicone rubber based pressure sensitive adhesive sheet comprising a transparent substrate film and a silicone rubber layer which is formed by coating the surface of the transparent substrate film with silicone rubber in an amount of 5 to 100 $g/m^2$ (after drying) containing addition type organopolysiloxane composed of organopolysiloxane having a siloxane bond as a principal skeleton and bearing an alkenyl group and of organohydrogenpolysiloxane and also containing 0.01 to 3.0 parts by mass of a platinum catalyst based on 100 parts by mass of said addition type organopolysiloxane and then by curing the resultant coating, and which has adhesion for float glass in accordance with JIS Z 0237 being in the range of 10 to 1000 mN/25 mm, holding power (load of one kg) of at least 24 hours and a 100% modulus in the range of 0.3 to 1.5 MPa.

2. The silicone rubber based pressure sensitive adhesive sheet as set forth in the preceding item 1 wherein the transparent substrate film is polyester film.

3. The silicone rubber based pressure sensitive adhesive sheet as set forth in the preceding item 1 or 2, wherein said alkenyl group in said addition type organopolysiloxane is vinyl group.

4. The silicone rubber based pressure sensitive adhesive sheet as set forth in any of the preceding items 1 to 3, wherein said silicone rubber which forms the silicone rubber layer further contains at most 50 parts by mass of a silicone resin based on 100 parts by mass of said addition type organopolysiloxane.

DESCRIPTION OF THE PREFERRED EMBODIMENTS

The transparent substrate film in the silicone rubber based pressure sensitive adhesive sheet according to the present invention is not specifically limited, but may be properly optionally selected for use from among plastic films that have hitherto been well known as a substrate for optical films.

Examples of the above-mentioned plastic films include polyester films such as polyethylene terephthalate films, polybutylene terephthalate films and polyethylene naphthalate films, polyethylene films, polypropylene films, cellophane films, diacetyl cellulose films, triacetyl cellulose films, acetyl cellulose butylate films, polyvinyl chloride films, polyvinylidene chloride films, polyvinyl alcohol films, ethylene/vinyl acetate copolymer films, polystyrene films, polycarbonate films, polymethylpentene films, polysulfone films, polyether ether ketone films, polyether sulfone films, polyether imide films, polyimide films, fluororesin films, polyamide films, acrylic resin films, norbornene based resin films and cyclic olefin based film. Of these, polyester films, especially polyethylene terephthalate films are preferable from the aspect of film transparency.

The thickness of the substrate film, which is not specifically limited, is in the range of preferably 5 to 500 μm, particularly 20 to 250 μm. The thickness thereof, when being less than 5 μm, results in liability to break or rupture, thus causing a fear of deteriorating the processability, whereas the thickness thereof, when being more than 500 μm, results in liability to insufficient flexibility, thus causing a fear of deteriorating the processability The substrate film, when desired, may be subjected to a surface treatment by means of an oxidation method, unevenly patterning method or the like or may be formed an easily adhesive layer on one side or both the sides for the purpose of enhancing the adhesiveness between the film and the silicone rubber layer.

The above-mentioned oxidation method is exemplified, for instance, by a corona discharge treatment, chromic acid treatment (wet system), flame treatment, hot air treatment and ozone/ultraviolet ray irradiation treatment. The unevenly patterning method is exemplified, for instance, by a sand blast treatment method and solvent treatment method.

The surface treatment method, which is properly optionally selected in accordance with the type of the substrate film, is usually preferably a corona discharge treatment from the point of view of working effect and operability.

Examples of materials for the easily adhesive layer include polyester resin and polyurethane resin.

As the silicone rubber that forms the silicone rubber layer in the silicone rubber based pressure sensitive adhesive sheet according to the present invention, use is made of silicone rubber which contain as constituent components, a platinum catalyst and addition type organopolysiloxane composed of organopolysiloxane having a siloxane bond as a principal skeleton and bearing an alkenyl group and of organohydrogenpolysiloxane.

The organopolysiloxane having a siloxane bond as a principal skeleton and bearing an alkenyl group is a compound represented by the following average unit formula (1) and has at least two alkenyl groups in one molecule of the compound.

$$R^1_a SiO_{(4-a)/2} \quad (1)$$

wherein $R^1$ is a same or different non-substituted or substituted univalent hydrocarbon group having 1 to 12, preferably 1 to 8 carbon atoms, and a is a positive number in the range of 1.5 to 2.8, preferably 1.8 to 2.5, more preferably 1.95 to 2.05.

Examples of the non-substituted or substituted univalent hydrocarbon group bonded to a silicon atom which is represented by the above-mentioned $R^1$ include an alkenyl group such as vinyl group, allyl group, propenyl group, isopropenyl group, butenyl group, hexenyl group, cyclohexenyl group and octenyl group; an alkyl group such as methyl group, ethyl group, propyl group, isopropyl group, butyl group, isobutyl group, tert-butyl group, pentyl group, neopentyl group, hexyl group, cyclohexyl group, octyl group, nonyl group and decyl group; an aryl group such as phenyl group, tolyl group, xylyl group and naphtyl group; an aralkyl group such as benzyl group, phenylethyl group and phenylpropyl group; the foregoing groups in which part or whole of the hydrogen atoms is substituted with a halogen atom such as fluorine, bromine or chlorine, cyano group or the like, for instance, chloromethyl group, chloropropyl group, bromoethyl group, trifluoropropyl group and cyanoethyl group.

Vinyl group is referable alkenyl group in terms of short curing time and high productivity.

The organohydrogenpolysiloxane, which bears SiH group in its molecule, causes addition reaction with the alkenyl groups of the organopolysiloxane having a siloxane bond as a principal skeleton and bearing an alkenyl group so that the silicone rubber is cured.

The platinum catalyst is exemplified by platinum black, platinum (II) chloride, chloroplatinic acid, reaction product of chloroplatinic acid and a monohydric alcohol, a complex of chloroplatinic acid and an olefin and platinum bisacetoacetate.

The above-cited platinum catalyst is necessarily used in an amount of 0.01 to 3.0 parts by mass based on 100 parts by mass of the addition type organopolysiloxane, and is preferably used in an amount of 0.05 to 2 parts by mass based thereon.

The amount of the platinum catalyst to be used, when being less than 0.01 part by mass based on 100 parts by mass of the addition type organopolysiloxane, brings about inferior removability due to insufficient curing, whereas the amount thereof, when being more than 3 parts by mass based thereon, leads to inferior sticking property, unreasonably fast gelling by addition reaction and difficulty in coating the transparent substrate film.

The addition type organopolysiloxane may be incorporated with any of a variety of silicone resins that are used in a silicone based pressure sensitive adhesive, namely organopolysiloxane containing trifunctional or tetrafunctional siloxane unit in its molecule for the purpose of enhancing adhesion to the extent that the objects of the present invention are not impaired thereby.

The content of the above-mentioned silicone resins is preferably at most 50 parts by mass based on 100 parts by mass of the addition type organopolysiloxane, more preferably in the range of 5 to 20 parts by mass based thereon. When the content thereof exceeds 50 parts by mass based thereon, there is a fear that adhesion is unreasonably heightened, thereby bringing about a fear of difficulty in repetitive releasing.

A variety of processes are taken into consideration as a process for the production of the silicone rubber based pressure sensitive adhesive sheet according to the present invention. One of suitable processes is that which comprises coating one side of the transparent substrate film with a silicone rubber solution in which the addition type organopolysiloxane and the platinum catalyst are diluted with a solvent such as methyl ethyl ketone, toluene, ethyl acetate or xylene to a concentration of about 10 to 60% by mass, heating the coating to 90 to 180° C. for 1 to 5 minutes to cure the same whereby the silicone rubber layer is formed.

The coating amount of the silicone rubber is necessarily 5 to 100 g/m² (after drying) and is preferably 10 to 60 g/m² (after drying). The coating amount thereof, when being less than 5 g/m² (after drying), gives rise to insufficient holing power, whereas the coating amount, when being more than 100 g/m² (after drying), unfavorably prolongs the curing time.

In the silicone rubber based pressure sensitive adhesive sheet according to the present invention, which is formed by the above-mentioned materials and production process, the silicone rubber layer is required at the same time, to be imparted with adhesion for float glass in accordance with JIS Z 0237 being in the range of 10 to 1000 mN/25 mm, holding power (load of one kg) of at least 24 hours and a 100% modulus in the range of 0.3 to 1.5 MPa.

The adhesion for float glass, when being less than 10 mN/25 mm, gives rise to difficulty in sticking to an adherend such as a display screen, whereas the strength, when being more than 1000 mN/25 mm, brings about difficulty in repetitive releasing.

The holding power (load of one kg), when being less than 24 hours, results in deteriorated releasability from an adherend, whereas the holding power, the upper limit of which is not specifically set, is preferably 10000 hours, approximately.

The 100% modulus, when being less than 0.3 MPa, gives rise to deteriorated adhesiveness between the silicone rubber and the substrate film, whereas the 100% modulus, when being more than 1.5 MPa, brings about liability to air penetration (penetration of air between the adherend and pressure sensitive adhesive sheet).

The working effects and industrial applicability of the present invention will be described in the following.

According to the present invention, there is obtained the silicone rubber based pressure sensitive adhesive sheet which is imparted with strong holding power, sufficient adhesiveness to the substrate film and sufficient removability from an adherend enabling repeated sticking even if an additive such as an adhesion improving agent is not blended, and at the same time which makes it possible to use as a releasing film, an inexpensive film not subjected to a releasing treatment, by coating a transparent substrate film with a prescribed amount of addition type organopolysiloxane-containing silicone rubber that has heretofore been generally used through thin coating onto a substrate as a releasing treatment agent, and then by curing the resultant coating, so as to form a silicone rubber layer having prescribed characteristics on the surface of the foregoing transparent substrate film.

Thus, the pressure sensitive adhesive sheet according to the present invention is preferably suitably usable for display screens in display units such as CRT displays, liquid crystal displays and plasma displays in an intact configuration, in such a configuration that a hard coat layer or a functional layer of anti-reflection, antistatic property, antifoulancy, antiglare or the like is directly formed on the face opposite to the silicone rubber layer for the transparent substrate film, or in such a configuration that a film having any of the foregoing layers is adhered to the above-mentioned face through an adhesive layer.

In what follows, the present invention will be described in more detail with reference to comparative examples and working examples, which however shall never limit the present invention thereto.

The performances of the pressure sensitive adhesive sheet as obtained in each of the comparative examples and working examples were evaluated in accordance with the following procedure.

(1) Adhesion for Float Glass

A silicone rubber based pressure sensitive adhesive sheet which has been cut into a size of 25 mm×250 mm and in which a releasing film has been peeled off was sticked to float glass (soda lime glass, manufactured by Nippon Sheet Glass Co., Ltd.) in an atmosphere of 23° C., 50% RH by the use of a 2 kg rubber roller, allowed to stand for 20 minutes, thereafter subjected to a measurement of releasing strength by 180 degrees at a releasing velocity of 300 mm/min in accordance with JIS Z 0237 prescribing the measuring method for adhesion, by the use of a universal tensile testing machine (manufactured by Orion Tech Co., Ltd. under the trade name Tensilon UTM-4-100).

(2) Holding Power

A silicone rubber based pressure sensitive adhesive sheet which has been cut into a size of 25 mm×150 mm and in which a releasing film has been peeled off was sticked to a vertical face of a stainless steel sheet (SUS304) polished with abrasive paper # 360 in an atmosphere of 23° C., 50% RH, allowed to stand for 20 minutes, thereafter transferred in an oven at 40° C., after the lapse of 20 minutes, fitted with a weight of one kg, allowed to stand in the oven, and subjected to a measurement of time until the sheet was dropped by slipping off in accordance with JIS Z 0237.

(3) 100% Modulus

A silicone rubber solution was applied as a coating to the releasingly treated face of a fluorine based releasing film (manufactured by Fujimori Kogyo Co., Ltd. under the trade name Film Bina 38E-0010YC), and heated at 130° C. for 2 minutes to form a silicone rubber layer having a thickness of 40 μm. Subsequently the releasing film was removed, and a 100% modulus was obtained by determining a stress/elongation curve by the use of a universal tensile testing machine under the conditions including a tensile velocity of 300 mm/minute, a specimen width of 5 mm and a tensile interval of 20 mm, and regarding the stress value at which the elongation reached 100% as 100% modulus expressed in terms of MPa.

(4) Sticking Property

A silicone rubber based pressure sensitive adhesive sheet which has been cut into a size of 25 mm×150 mm and in which a releasing film has been peeled off was sticked to float glass (soda lime glass, manufactured by Nippon Sheet Glass Co., Ltd.) by the use of a 2 kg rubber roller, and the number of generated bubbles (air penetration) was counted, so that an evaluation was made based on the following criterion.
number of generated bubbles being less than 5: good (G)
number of generated bubbles being 5 or more: poor (P)

(5) Adhesiveness

One hundred (100) gridiron cuts each of 1 mm square were formed on a silicone rubber layer of a silicone rubber based pressure sensitive adhesive sheet, and the resultant layer was subjected to rubbing off test wherein the surface of the layer was rubbed against a finger, so that an evaluation was made based on the following criterion.
Peeling off of silicone rubber layer not observed: good (G)
Peeling off of silicone rubber layer observed: poor (P)

(6) Repetitive Sticking Property

A silicone rubber based pressure sensitive adhesive sheet which has been cut into a size of 25 mm×150 mm and in which a releasing film has been peeled off was repeatedly sticked to and peeled off float glass (soda lime glass, manufactured by Nippon Sheet Glass Co., Ltd.) by the use of a 2 kg rubber roller, and the number of generated bubbles (air penetration) was counted when tenth sticking procedure was carried out, so that an evaluation was made based on the following criterion.
number of generated bubbles being less than 5: good (G)
number of generated bubbles being 5 or more: poor (P)

(7) Adhesion after Repetitive Sticking/Peeling off

A silicone rubber based pressure sensitive adhesive sheet which has been cut into a size of 25 mm×250 mm and in which a releasing film has been peeled off was repeatedly sticked to and peeled off float glass (soda lime glass, manufactured by Nippon Sheet Glass Co., Ltd.) by the use of a 2 kg rubber roller, and a measurement was made of the adhesion for float glass when tenth peeling off procedure was carried out.

Example 1

A silicone rubber solution was prepared by adding 0.03 part by mass of a platinum catalyst (manufactured by Shin-Etsu Chemical Co., Ltd. under the trade name PL-50T) to 100 parts by mass of addition type organopolysiloxane (manufactured by Shin-Etsu Chemical Co., Ltd. under the trade name KS-847H) composed of organopolysiloxane having a siloxane bond as a principal skeleton and bearing vinyl group and of organohydrogenpolysiloxane, and diluting the resultant mixture with methyl ethyl ketone to a solid component concentration of about 20% by mass.

The silicone rubber solution thus obtained was applied as a coating to one side of a polyethylene terephthalate (PET) film having a thickness of 50 μm (manufactured by Toray Co., Ltd.

under the trade name Lumilar T60) as the transparent substrate film in a coating amount of 30 g/m² (after drying) by the use of a knife coater, and cured by heating at 130° C. for 2 minutes to form a silicone rubber layer, which further was sticked to a polyethylene terephthalate (PET) film having a thickness of 38 μm (manufactured by Toray Co., Ltd. under the trade name Lumilar T60) as the releasing film. Thus there was obtained a silicone rubber based pressure sensitive adhesive sheet (with the releasing film) according to the present invention.

Table 1 gives various properties of the silicone rubber layer in the silicone rubber based pressure sensitive adhesive sheet including adhesion for float glass, holding power (load of one kg) and a 100% modulus. In addition, evaluations were made of sticking property, adhesiveness, repetitive sticking property and adhesion after repetitive sticking/peeling off for the resultant silicone rubber based pressure sensitive adhesive sheet. The results are given in Table 1.

Example 2

The procedure in Example 1 was repeated to prepare a silicone rubber based pressure sensitive adhesive sheet (with the releasing film) according to the present invention except that the platinum catalyst in the silicone rubber solution was used in an amount of 1.0 part by mass instead of 0.03 part by mass without altering the solid component concentration of about 20% by mass.

Thus evaluations were made of adhesion for float glass, holding power (load of one kg), 100% modulus, sticking property, adhesiveness, repetitive sticking property and adhesion after repetitive sticking/peeling off for the resultant silicone rubber based pressure sensitive adhesive sheet. The results are given in Table 1.

Example 3

The procedure in Example 1 was repeated to prepare a silicone rubber based pressure sensitive adhesive sheet (with the releasing film) according to the present invention except that the platinum catalyst in the silicone rubber solution was used in an amount of 1.0 part by mass instead of 0.03 part by mass and that there was added 10 parts by mass of a silicone resin (manufactured by Shin-Etsu Chemical Co., Ltd. under the trade name KR3700) without altering the solid component concentration of about 20% by mass.

Thus evaluations were made of adhesion for float glass, holding power (load of one kg), 100% modulus, sticking property, adhesiveness, repetitive sticking property and adhesion after repetitive sticking/peeling off for the resultant silicone rubber based pressure sensitive adhesive sheet. The results are given in Table 1.

Example 4

The procedure in Example 3 was repeated to prepare a silicone rubber based pressure sensitive adhesive sheet (with the releasing film) according to the present invention except that the silicone resin which was added to the silicone rubber solution was used in an amount of 40 parts by mass instead of 10 parts by mass without altering the solid component concentration of about 20% by mass.

Thus evaluations were made of adhesion for float glass, holding power (load of one kg), 100% modulus, sticking property, adhesiveness, repetitive sticking property and adhesion after repetitive sticking/peeling off for the resultant silicone rubber based pressure sensitive adhesive sheet. The results are given in Table 1.

Example 5

The procedure in Example 1 was repeated to prepare a silicone rubber based pressure sensitive adhesive sheet (with the releasing film) according to the present invention except that use was made of 0.02 part by mass of the platinum catalyst (manufactured by Toray Dow Corning Co., Ltd. under the trade name SRX-212) instead of 0.03 part by mass of the platinum catalyst (manufactured by Shin-Etsu Chemical Co., Ltd. under the trade name PL-50) in the silicone rubber solution without altering the solid component concentration of about 20% by mass.

Thus evaluations were made of adhesion for float glass, holding power (load of one kg), 100% modulus, sticking property, adhesiveness, repetitive sticking property and adhesion after repetitive sticking/peeling off for the resultant silicone rubber based pressure sensitive adhesive sheet. The results are given in Table 1.

Example 6

The procedure in Example 1 was repeated to prepare a silicone rubber based pressure sensitive adhesive sheet (with the releasing film) according to the present invention except that use was made of 1.0 part by mass of the platinum catalyst (manufactured by Toray Dow Corning Co., Ltd. under the trade name SRX-212) instead of 0.03 part by mass of the platinum catalyst (manufactured by Shin-Etsu Chemical Co., Ltd. under the trade name PL-50) in the silicone rubber solution without altering the solid component concentration of about 20% by mass.

Thus evaluations were made of adhesion for float glass, holding power (load of one kg), 100% modulus, sticking property, adhesiveness, repetitive sticking property and adhesion after repetitive sticking/peeling off for the resultant silicone rubber based pressure sensitive adhesive sheet. The results are given in Table 1.

Example 7

The procedure in Example 1 was repeated to prepare a silicone rubber based pressure sensitive adhesive sheet (with the releasing film) according to the present invention except that use was made of 1.0 part by mass of the platinum catalyst (manufactured by Toray Dow Corning Co., Ltd. under the trade name SRX-212) instead of 0.03 part by mass of the platinum catalyst (manufactured by Shin-Etsu Chemical Co., Ltd. under the trade name PL-50) in the silicone rubber solution and that there was added 10 parts by mass of a silicone resin(manufactured by Toray Dow Corning Co., Ltd. under the trade name SSD-4584) without altering the solid component concentration of about 20% by mass.

Thus evaluations were made of adhesion for float glass, holding power (load of one kg), 100% modulus, sticking property, adhesiveness, repetitive sticking property and adhesion after repetitive sticking/peeling off for the resultant silicone rubber based pressure sensitive adhesive sheet. The results are given in Table 1.

Example 8

The procedure in Example 7 was repeated to prepare a silicone rubber based pressure sensitive adhesive sheet (with the releasing film) according to the present invention except that there was added 45 parts by mass of the silicone resin instead of 10 parts by mass without altering the solid component concentration of about 20% by mass.

Thus evaluations were made of adhesion for float glass, holding power (load of one kg), 100% modulus, sticking property, adhesiveness, repetitive sticking property and adhesion after repetitive sticking/peeling off for the resultant silicone rubber based pressure sensitive adhesive sheet. The results are given in Table 1.

Example 9

The procedure in Example 1 was repeated to prepare a silicone rubber based pressure sensitive adhesive sheet (with the releasing film) according to the present invention except that the coating amount (after drying) of the silicone resin solution was set on 7 g/m$^2$ instead of 30 g/m$^2$.

Thus evaluations were made of adhesion for float glass, holding power (load of one kg), 100% modulus, sticking property, adhesiveness, repetitive sticking property and adhesion after repetitive sticking/peeling off for the resultant silicone rubber based pressure sensitive adhesive sheet. The results are given in Table 1.

Example 10

The procedure in Example 1 was repeated to prepare a silicone rubber based pressure sensitive adhesive sheet (with the releasing film) according to the present invention except that the coating amount (after drying) of the silicone resin solution was set on 15 g/m$^2$ instead of 30 g/m$^2$.

Thus evaluations were made of adhesion for float glass, holding power (load of one kg), 100% modulus, sticking property, adhesiveness, repetitive sticking property and adhesion after repetitive sticking/peeling off for the resultant silicone rubber based pressure sensitive adhesive sheet. The results are given in Table 1.

Example 11

The procedure in Example 1 was repeated to prepare a silicone rubber based pressure sensitive adhesive sheet (with the releasing film) according to the present invention except that the coating amount (after drying) of the silicone resin solution was set on 25 g/m$^2$ instead of 30 g/m$^2$.

Thus evaluations were made of adhesion for float glass, holding power (load of one kg), 100% modulus, sticking property, adhesiveness, repetitive sticking property and adhesion after repetitive sticking/peeling off for the resultant silicone rubber based pressure sensitive adhesive sheet. The results are given in Table 1.

Example 12

The procedure in Example 1 was repeated to prepare a silicone rubber based pressure sensitive adhesive sheet (with the releasing film) according to the present invention except that the coating amount (after drying) of the silicone resin solution was set on 90 g/m$^2$ instead of 30 g/m$^2$.

Thus evaluations were made of adhesion for float glass, holding power (load of one kg), 100% modulus, sticking property, adhesiveness, repetitive sticking property and adhesion after repetitive sticking/peeling off for the resultant silicone rubber based pressure sensitive adhesive sheet. The results are given in Table 1.

Comparative Example 1

The procedure in Example 1 was repeated to prepare a silicone rubber based pressure sensitive adhesive sheet (with the releasing film) except that the platinum catalyst was used in an amount of 0.005 part by mass instead of 0.03 part by mass without altering the solid component concentration of about 20% by mass.

Thus evaluations were made of adhesion for float glass, holding power (load of one kg), 100% modulus, sticking property, adhesiveness, repetitive sticking property and adhesion after repetitive sticking/peeling off for the resultant silicone rubber based pressure sensitive adhesive sheet. The results are given in Table 1.

Comparative Example 2

The procedure in Example 1 was repeated to prepare a silicone rubber based pressure sensitive adhesive sheet (with the releasing film) except that the platinum catalyst was used in an amount of 3.5 parts by mass instead of 0.03 part by mass without altering the solid component concentration of about 20% by mass.

Thus evaluations were made of adhesion for float glass, holding power (load of one kg), 100% modulus, sticking property, adhesiveness, repetitive sticking property and adhesion after repetitive sticking/peeling off for the resultant silicone rubber based pressure sensitive adhesive sheet. The results are given in Table 1.

Comparative Example 3

The procedure in Example 1 was repeated to prepare a silicone rubber based pressure sensitive adhesive sheet (with the releasing film) except that use was made of 0.005 part by mass of the platinum catalyst (manufactured by Toray Dow Corning Co., Ltd. under the trade name SRX-212) instead of 0.03 part by mass of the platinum catalyst (manufactured by Shin-Etsu Chemical Co., Ltd. under the trade name PL-50) in the silicone rubber solution without altering the solid component concentration of about 20% by mass.

Thus evaluations were made of adhesion for float glass, holding power (load of one kg), 100% modulus, sticking property, adhesiveness, repetitive sticking property and adhesion after repetitive sticking/peeling off for the resultant silicone rubber based pressure sensitive adhesive sheet. The results are given in Table 1.

Comparative Example 4

The procedure in Example 1 was repeated to prepare a silicone rubber based pressure sensitive adhesive sheet (with the releasing film) except that use was made of 3.5 parts by mass of the platinum catalyst (manufactured by Toray Dow Corning Co., Ltd. under the trade name SRX-212) instead of 0.03 part by mass of the platinum catalyst (manufactured by Shin-Etsu Chemical Co., Ltd. under the trade name PL-50) in the silicone rubber solution without altering the solid component concentration of about 20% by mass.

Thus evaluations were made of adhesion for float glass, holding power (load of one kg), 100% modulus, sticking property, adhesiveness, repetitive sticking property and adhesion after repetitive sticking/peeling off for the resultant silicone rubber based pressure sensitive adhesive sheet. The results are given in Table 1.

Comparative Example 5

The procedure in Example 1 was repeated to prepare a silicone rubber based pressure sensitive adhesive sheet (with the releasing film) except that the coating amount (after drying) of the silicone resin solution was set on 3 g/m² instead of 30 g/m².

Thus evaluations were made of adhesion for float glass, holding power (load of one kg), 100% modulus, sticking property, adhesiveness, repetitive sticking property and adhesion after repetitive sticking/peeling off for the resultant silicone rubber based pressure sensitive adhesive sheet. The results are given in Table 1.

Comparative Example 6

The procedure in Example 1 was repeated to prepare a silicone rubber based pressure sensitive adhesive sheet (with the releasing film) except that the coating amount (after drying) of the silicone resin solution was set on 1 g/m² instead of 30 g/m².

Thus evaluations were made of adhesion for float glass, holding power (load of one kg), 100% modulus, sticking property, adhesiveness, repetitive sticking property and adhesion after repetitive sticking/peeling off for the resultant silicone rubber based pressure sensitive adhesive sheet. The results are given in Table 1.

Comparative Example 7

The procedure in Example 1 was repeated to prepare a silicone rubber based pressure sensitive adhesive sheet (with the releasing film) except that the coating amount (after drying) of the silicone resin solution was set on 0.5 g/m² instead of 30 g/m².

Thus evaluations were made of adhesion for float glass, holding power (load of one kg), 100% modulus, sticking property, adhesiveness, repetitive sticking property and adhesion after repetitive sticking/peeling off for the resultant silicone rubber based pressure sensitive adhesive sheet. The results are given in Table 1.

Comparative Example 8

The procedure in Example 1 was repeated to prepare a silicone rubber based pressure sensitive adhesive sheet (with the releasing film) except that the coating amount (after drying) of the silicone resin solution was set on 0.1 g/m² instead of 30 g/m².

Thus evaluations were made of adhesion for float glass, holding power (load of one kg), 100% modulus, sticking property, adhesiveness, repetitive sticking property and adhesion after repetitive sticking/peeling off for the resultant silicone rubber based pressure sensitive adhesive sheet. The results are given in Table 1.

The sheet could not be sticked to any of float glass and a stainless steel sheet.

|  | Various characteristics of silicone rubber layer | | | Evaluation of silicone rubber based pressure sensitive adhesive sheet | | | |
| --- | --- | --- | --- | --- | --- | --- | --- |
|  | Adhesion for float glass (mN/25 mm) | Holding power (time) | 100% modulus (Mpa) | Sticking Property | Adhesiveness | Repetitive sticking property | Adhesion after repetitive sticking/peeling off (mN/25 mm) |
| Ex. 1 | 62 | >24 | 0.71 | G | ○ | G | 60 |
| Ex. 2 | 60 | >24 | 0.83 | G | ○ | G | 61 |
| Ex. 3 | 90 | >24 | 0.84 | G | ○ | G | 88 |
| Ex. 4 | 920 | >24 | 0.86 | G | ○ | G | 945 |
| Ex. 5 | 60 | >24 | 0.64 | G | ○ | G | 62 |
| Ex. 6 | 58 | >24 | 0.80 | G | ○ | G | 60 |
| Ex. 7 | 95 | >24 | 0.82 | G | ○ | G | 94 |
| Ex. 8 | 940 | >24 | 0.85 | G | ○ | G | 953 |
| Ex. 9 | 40 | >24 | 0.71 | G | ○ | G | 40 |
| Ex. 10 | 40 | >24 | 0.71 | G | ○ | G | 42 |
| Ex. 11 | 42 | >24 | 0.71 | G | ○ | G | 42 |
| Ex. 12 | 65 | >24 | 0.71 | G | ○ | G | 65 |
| CoEx. 1 | 59 | >24 | 0.23 | G | x | G | 60 |
| CoEx. 2 | 60 | >24 | 1.68 | P | ○ | P | 59 |
| CoEx. 3 | 58 | >24 | 0.21 | G | x | G | 58 |
| CoEx. 4 | 57 | >24 | 1.64 | P | ○ | P | 58 |
| CoEx. 5 | 30 | >24 | 0.71 | P | ○ | P | 27 |
| CoEx. 6 | 25 | 0 | 0.71 | P | ○ | P | 23 |
| CoEx. 7 | 25 | 0 | 0.71 | P | ○ | P | 22 |
| CoEx. 8 | Δ | Δ | 0.71 | P | ○ | P | Δ |

{remarks} Ex.; Example, CoEx.; Comparative Example, Δ ; un-measurable G ; good, ○ ; good, x ; poor, P ; poor,

What is claimed is:

1. A silicone rubber based pressure sensitive adhesive sheet comprising:
   a transparent substrate film and
   a silicone rubber layer;
   wherein the adhesive sheet is formed by a process comprising
   coating the surface of the transparent substrate film with silicone rubber in an amount of from 30 to 100 g/m² after drying, to form the adhesive sheet,
   and then curing the resulting coating;
   wherein the silicone rubber comprises:
   an addition organopolysiloxane comprising an organopolysiloxane having a siloxane bond as a principal skeleton and bearing an alkenyl group and an organohydrogenpolysiloxane, wherein the organopolysiloxane having a siloxane bond as a principal skeleton and bearing an alkenyl group is a compound represented by the following average unit formula (1) and has at least two alkenyl groups, $$R^1{}_a SiO_{(4-a)/2} \tag{1}$$

wherein
R$^1$ is a same or different non-substituted or substituted univalent hydrocarbon group having 1 to 12 carbon atoms, and
a is a positive number ranging from 1.5 to 2.8,
from 0.01 to 3.0 parts by mass of a platinum catalyst based on 100 parts by mass of said addition organopolysiloxane, and
a silicone resin which is present and in amount no greater than 10 parts by mass, based on 100 parts by mass of said addition organopolysiloxane;
wherein the silicone resin comprises trifunctional or tetrafunctional siloxane units,
wherein the adhesive sheet has adhesion for float glass in accordance with JIS Z 0237 being in the range of 10 to 1000 mN/25 mm, a holding power, with a load of one kg, of at least 24 hours, and a 100% modulus in the range of 0.3 to 1.5 MPa.

2. The silicone rubber based pressure sensitive adhesive sheet according to claim 1, wherein the transparent substrate film is polyester film.

3. The silicone rubber based pressure sensitive adhesive sheet according to claim 2, wherein the polyester film is a polyethylene terephthalate film.

4. The silicone rubber based pressure sensitive adhesive sheet according to claim 2, wherein the polyester film is a polybutylene terephthalate film.

5. The silicone rubber based pressure sensitive adhesive sheet according to claim 2, wherein the polyester film is a polyethylene naphthalate film.

6. The silicone rubber based pressure sensitive adhesive sheet according to claim 1 or 2, wherein said alkenyl group in said addition organopolysiloxane is vinyl group.

7. The silicone rubber based pressure sensitive adhesive sheet according to claim 1, wherein the transparent substrate film is selected from the group consisting of a polyester film, a polyethylene film, a polypropylene film, a cellophane film, a diacetyl cellulose film, a triacetyl cellulose film, an acetyl cellulose butylate film, a polyvinyl chloride film, a polyvinylidene chloride film, a polyvinyl alcohol film, an ethylene/vinyl acetate copolymer film, a polystyrene film, a polycarbonate film, a polymethylpentene film, a polysulfone film, a polyether ether ketone film, a polyether sulfone film, a polyether imide film, a polyimide film, a fluororesin film, a polyamide film, an acrylic resin film, a norbornene based resin film, and a cyclic olefin based film.

8. The silicone rubber based pressure sensitive adhesive sheet according to claim 1, wherein the transparent substrate film has a thickness ranging from 5 μm to 500 μm.

9. The silicone rubber based pressure sensitive adhesive sheet according to claim 1, wherein the transparent substrate film has a thickness ranging from 20 μm to 250 μm.

10. The silicone rubber based pressure sensitive adhesive sheet according to claim 1, wherein the silicone rubber comprises from 0.05 to 2.0 parts by mass of the platinum catalyst based on 100 parts by mass of said addition organopolysiloxane.

11. The silicone rubber based pressure sensitive adhesive sheet according to claim 1, wherein in the process for forming the adhesive sheet, the transparent substrate film is coated with silicone rubber in an amount of from 60 to 100 g/m$^2$ after drying.

12. The silicone rubber based pressure sensitive adhesive sheet according to claim 1, wherein in the process for forming the adhesive sheet, the transparent substrate film is coated with silicone rubber in an amount of from 30 to 60 g/m$^2$ after drying.

13. A silicone rubber based pressure sensitive adhesive sheet, comprising:
a transparent substrate film, and
a silicone rubber layer;
wherein the adhesive sheet is formed by a process comprising:
coating a surface of the transparent substrate film with silicone rubber in an amount of 30 to 100 g/m$^2$ after drying, to form a coating, and
curing the resulting coating to form the adhesive sheet;
wherein the silicone rubber comprises an addition organopolysiloxane comprises organopolysiloxane having a siloxane bond as a principal skeleton and bearing an alkenyl group and an organohydrogenpolysiloxane,
wherein the organopolysiloxane having a siloxane bond as a principal skeleton and bearing an alkenyl group is a compound represented by the following average unit formula (1) and has at least two alkenyl groups, $$R^1{}_a SiO_{(4-a)/2} \tag{1}$$

wherein
R$^1$ is a same or different non-substituted or substituted univalent hydrocarbon group having 1 to 12 carbon atoms, and
a is a positive number ranging from 1.5 to 2.8,
a platinum catalyst present in an amount of from 0.01 to 3.0 parts by mass based on 100 parts by mass of said addition organopolysiloxane,
and
from 5 to 10 parts by mass of a silicone resin based on 100 parts by mass of said addition organopolysiloxane;
wherein the silicone resin comprises trifunctional or tetrafunctional siloxane units,
wherein the adhesive sheet has adhesion for float glass in accordance with JIS Z 2037 being in the range of 10 to 1000 mN/25 mm, a holding power, with a load of one kg, of at least 24 hours, and a 100% modulus in the range of 0.3 to 1.5 MPa.

14. The silicone rubber based pressure sensitive adhesive sheet according to claim 13, wherein the platinum catalyst is present in the silicone rubber in an amount of from 0.05 to 2.0 parts by mass, based on 100 parts by mass of said addition organopolysiloxane.

15. The silicone rubber based pressure sensitive adhesive sheet according to claim 13, wherein in the process for forming the adhesive sheet, the transparent substrate film is coated with silicone rubber in an amount of from 60 to 100 g/m$^2$ after drying.

16. The silicone rubber based pressure sensitive adhesive sheet according to claim 13, wherein in the process for forming the adhesive sheet, the transparent substrate film is coated with silicone rubber in an amount of from 30 to 60 g/m$^2$ after drying.

17. A silicone rubber based pressure sensitive adhesive sheet comprising:

a transparent substrate film and a silicone rubber layer;

wherein the adhesive sheet is formed by a process comprising coating the surface of the transparent substrate film with silicone rubber in an amount of from 30 to 100 g/m² after drying, to form the adhesive sheet, and then curing the resulting coating;

wherein the silicone rubber comprises:

an addition organopolysiloxane comprising an organopolysiloxane having a siloxane bond as a principal skeleton and bearing an alkenyl group and an organohydrogenpolysiloxane, wherein the organopolysiloxane having a siloxane bond as a principal skeleton and bearing an alkenyl group is a compound represented by the following average unit formula (I) and has at least two alkenyl groups, $$R^1_a SiO_{(4-a)/2} \quad (1)$$

wherein

R¹ is a same or different non-substituted or substituted univalent hydrocarbon group having 1 to 12 carbon atoms, and a is a positive number ranging from 1.95 to 2.05, from 0.01 to 3.0 parts by mass of a platinum catalyst based on 100 parts by mass of said addition organopolysiloxane, and 0 parts by mass of a silicone resin based on 100 parts by mass of said addition organopolysiloxane;

wherein the adhesive sheet has adhesion for float glass in accordance with JIS Z 0237 being in the range of 10 to 1000 mN/25 mm, a holding power, with a load of one kg, of at least 24 hours, and a 100% modulus in the range of 0.3 to 1.5 MPa based on 100 parts by mass of said addition organopolysiloxane.

* * * * *